Figure 1:
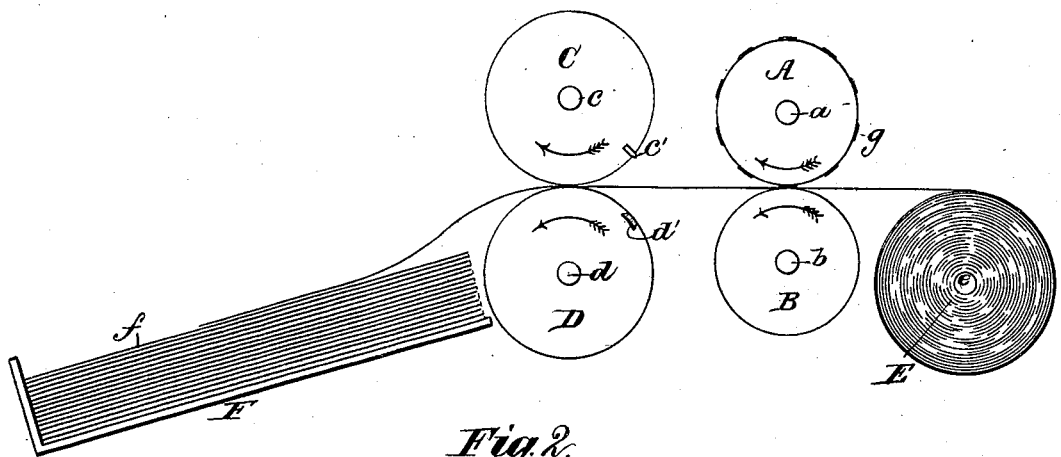

No. 614,809. Patented Nov. 22, 1898.
E. A. HENKLE.
ART OF PRINTING AND COLLECTING OR ASSEMBLING NUMBERED CHECKS OR LEAVES.
(Application filed Dec. 16, 1897.)

(No Model.) 3 Sheets—Sheet 1.

Witnesses.
Robert Errett,
F. B. Keefer

Inventor,
Edward A. Henkle.
By James L. Norris.
Atty.

No. 614,809. Patented Nov. 22, 1898.
E. A. HENKLE.
ART OF PRINTING AND COLLECTING OR ASSEMBLING NUMBERED CHECKS OR LEAVES.
(Application filed Dec. 16, 1897.)
(No Model.) 3 Sheets—Sheet 2.
Fig. 5.
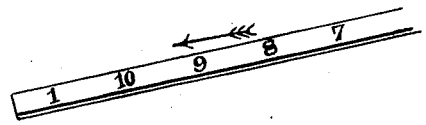
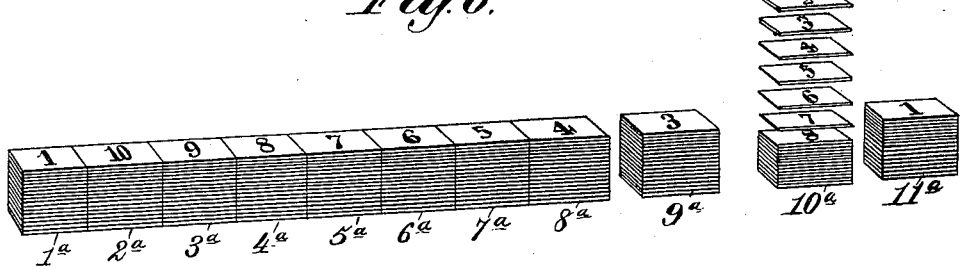
Fig. 6.
Witnesses. Inventor.
Edward A. Henkle.
By James L. Norris.
Atty.

No. 614,809. Patented Nov. 22, 1898.
E. A. HENKLE.
ART OF PRINTING AND COLLECTING OR ASSEMBLING NUMBERED CHECKS OR LEAVES.
(Application filed Dec. 16, 1897.)

(No Model.) 3 Sheets—Sheet 3.

Fig. 7.

| 9 | 8 | 7 | 6 | 5 | 4 | 3 | 2 | 1 |
|---|---|---|---|---|---|---|---|---|
| 8 | 7 | 6 | 5 | 4 | 3 | 2 | 1 | 10 |
| 7 | 6 | 5 | 4 | 3 | 2 | 1 | 10 | 9 |
| 6 | 5 | 4 | 3 | 2 | 1 | 10 | 9 | 8 |
| 5 | 4 | 3 | 2 | 1 | 10 | 9 | 8 | 7 |
| 4 | 3 | 2 | 1 | 10 | 9 | 8 | 7 | 6 |
| 3 | 2 | 1 | 10 | 9 | 8 | 7 | 6 | 5 |
| 2 | 1 | 10 | 9 | 8 | 7 | 6 | 5 | 4 |
| 1 | 10 | 9 | 8 | 7 | 6 | 5 | 4 | 3 |
| 10 | 9 | 8 | 7 | 6 | 5 | 4 | 3 | 2 |

Fig. 8.

| 2 | 1 | 10 | 9 | 8 | 7 | 6 | 5 | 4 | 3 | 2 | 1 |
|---|---|---|---|---|---|---|---|---|---|---|---|
| 4 | 3 | 2 | 1 | 10 | 9 | 8 | 7 | 6 | 5 | 4 | 3 |
| 6 | 5 | 4 | 3 | 2 | 1 | 10 | 9 | 8 | 7 | 6 | 5 |
| 8 | 7 | 6 | 5 | 4 | 3 | 2 | 1 | 10 | 9 | 8 | 7 |
| 10 | 9 | 8 | 7 | 6 | 5 | 4 | 3 | 2 | 1 | 10 | 9 |
| 2 | 1 | 10 | 9 | 8 | 7 | 6 | 5 | 4 | 3 | 2 | 1 |
| 4 | 3 | 2 | 1 | 10 | 9 | 8 | 7 | 6 | 5 | 4 | 3 |
| 6 | 5 | 4 | 3 | 2 | 1 | 10 | 9 | 8 | 7 | 6 | 5 |
| 8 | 7 | 6 | 5 | 4 | 3 | 2 | 1 | 10 | 9 | 8 | 7 |
| 10 | 9 | 8 | 7 | 6 | 5 | 4 | 3 | 2 | 1 | 10 | 9 |

Fig. 9.

| 8 | 7 | 6 | 5 | 4 | 3 | 2 | 1 |
|---|---|---|---|---|---|---|---|
| 6 | 5 | 4 | 3 | 2 | 1 | 10 | 9 |
| 4 | 3 | 2 | 1 | 10 | 9 | 8 | 7 |
| 2 | 1 | 10 | 9 | 8 | 7 | 6 | 5 |
| 10 | 9 | 8 | 7 | 6 | 5 | 4 | 3 |
| 8 | 7 | 6 | 5 | 4 | 3 | 2 | 1 |
| 6 | 5 | 4 | 3 | 2 | 1 | 10 | 9 |
| 4 | 3 | 2 | 1 | 10 | 9 | 8 | 7 |
| 2 | 1 | 10 | 9 | 8 | 7 | 6 | 5 |
| 10 | 9 | 8 | 7 | 6 | 5 | 4 | 3 |

Witnesses.
Robert Everett
F. B. Kerfer

Inventor.
Edward A. Henkle.
By James L. Norris.
Att'y.

UNITED STATES PATENT OFFICE.

EDWARD A. HENKLE, OF PHILADELPHIA, PENNSYLVANIA.

ART OF PRINTING AND COLLECTING OR ASSEMBLING NUMBERED CHECKS OR LEAVES.

SPECIFICATION forming part of Letters Patent No. 614,809, dated November 22, 1898.

Application filed December 16, 1897. Serial No. 662,177. (No model.)

*To all whom it may concern:*

Be it known that I, EDWARD A. HENKLE, a citizen of the United States, residing at Philadelphia, in the county of Philadelphia and State of Pennsylvania, have invented new and useful Improvements in the Art of Printing and Collecting or Assembling Numbered Checks or Leaves, of which the following is a specification.

My invention relates to the art of printing and collecting or assembling numbered checks or leaves, and has for its object to provide a new and improved means for printing numbers in regular order on a web and thereupon separating said web into strips and assembling the strips in a pile in such manner that when said strips are subsequently cut into blocks or piles of checks, each of the latter containing a number, the numbers on the checks in each pile shall run in numerical sequence.

The invention consists in combining with a printing-press adapted to print at intervals on an endless web of paper numbers running in regular order cutting mechanism so timed in relation to the output of the press that it will operate to cut said web transversely into strips and at such intervals that as the strips fall upon one another after the cutting to form a pile the vertical series of numbers shall run in numerical sequence, thus affording an automatic arrangement of the numbers, it only remaining to cut said pile of strips into blocks of checks each check of which shall contain a number.

The general object and purposes of the invention being as above stated I will now proceed to describe the same in detail, having reference to the accompanying drawings, in which—

Figure 2:
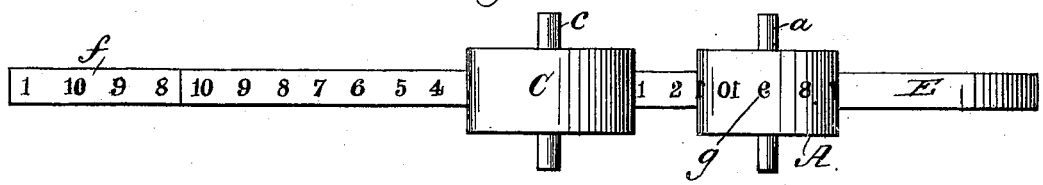
Figure 3:
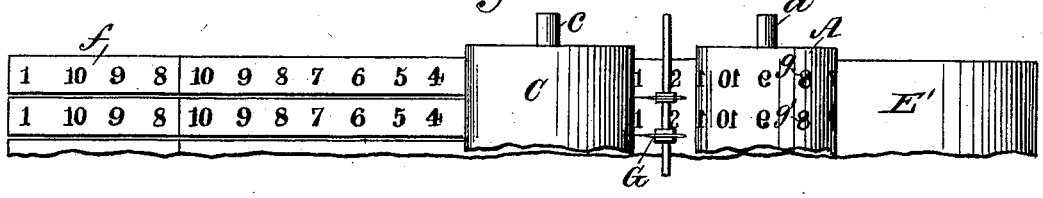
Figure 4:
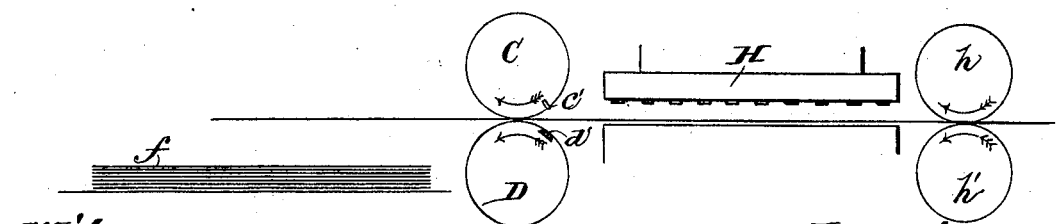

Figure 1 is a view in side elevation, showing the printing and impression cylinder of a press with my improved cutting mechanism applied thereto. Fig. 2 is a plan view of the same. Fig. 3 is a similar view showing a cylinder adapted to print two or more rows of numbers on a web and cutters for separating said web longitudinally into a plurality of strips containing the numbers before the web reaches the transverse cutter. Fig. 4 is a view in side elevation, showing my invention applied to a bed and platen press. Fig. 5 is a representation of a number of the strips assembled as they pass from the cutting mechanism and showing several of them separated to better illustrate the locations of the numbers thereon. Fig. 6 is a representation of a pile of said strips cut into blocks of checks. Figs. 7, 8, and 9 are views similar to Fig. 5, illustrating modifications in the manner of assembling the strips.

The letter A indicates the printing-cylinder on a suitable shaft $a$, and B the impression-cylinder on a suitable shaft $b$, of a cylinder printing-press. Secured on a shaft $c$ in suitable proximity to said cylinders and on the delivery side thereof is my improved cutting-cylinder C, beneath which, on a shaft $d$, is a cylinder D.

The letter $e$ indicates a suitable shaft, upon which is wound a web of paper E. The paper is conducted between the cylinders A B and C D, the cylinder D serving as a support for the paper and also as an impact-cylinder for the knife $c'$ of cylinder C.

The letter F indicates a suitable tray for receiving the separated strips $f$ as they come from the cutting mechanism. The mechanism shown in Fig. 1 is designed to print at intervals on a narrow endless strip or web of paper E a single row of numbers running from "1" to "10," and the cylinder A has therefore but a single line $g$ of type-numbers thereon. Where it is desired to print two or more rows of numbers at the same time, as shown in Fig. 3, a correspondingly wide web of paper E' would be employed and the printing-cylinder would have a corresponding number of lines of type-numbers $g$ $g'$. In this construction, however, rotary cutters G, suitably spaced, would be employed between the printing-cylinder A and the cutting-cylinder C to separate the wide web into narrow strips containing the numbers. The same would hold equally true, of course, with the bed and platen press H. (Shown in Fig. 4.)

While I may employ any suitable means for cutting the web into strip-sections, I have herein shown and described the preferred means, which consists in transverse rotary cutting mechanism operating in connection with the printing-cylinder. This cutting mechanism comprises the cylinder C, having on its periphery a knife $c'$, and a cylinder D, having in its periphery a recess $d'$ to receive said knife. The cylinder C in the preferred form of the invention has a greater diameter than the cylinder A, and this diameter bears such ratio to that of printing-cylinder A that in the revolution of the two cylinders the knife $c'$ will operate one step or space behind a given type on the printing-cylinder. In other words, the cylinder A in the illustration given will continuously print on an endless strip a series of numbers running from "1" to "10." The cutting-cylinder, however, has such an increased diameter with respect to the cylinder A that in its revolution the knife $c'$ will reach the web E and separate the same only at every eleventh number. Thus the numbers on the first strip cut off by the knife $c'$ would run as follows: "10, 9, 8, 7, 6, 5, 4, 3, 2, 1, 10," as indicated by strip 1 in Fig. 5. The second strip would have the following order of numbers: "9, 8, 7, 6, 5, 4, 3, 2, 1, 10, 9;" the third, "8, 7, 6, 5, 4, 3, 2, 1, 10, 9, 8;" the fourth, "7, 6, 5, 4, 3, 2, 1, 10, 9, 8, 7;" the fifth, "6, 5, 4, 3, 2, 1, 10, 9, 8, 7, 6;" the sixth, "5, 4, 3, 2, 1, 10, 9, 8, 7, 6, 5;" the seventh, "4, 3, 2, 1, 10, 9, 8, 7, 6, 5, 4;" the eighth, "3, 2, 1, 10, 9, 8, 7, 6, 5, 4, 3;" the ninth, "2, 1, 10, 9, 8, 7, 6, 5, 4, 3, 2;" the tenth, "1, 10, 9, 8, 7, 6, 5, 4, 3, 2, 1." Thus it will be seen that as these strips fall upon one another as they pass from the cutting mechanism the numbers are automatically arranged in vertical series, every pile of ten strips containing eleven vertical series of numbers running from "1" to "10." Each pile of ten strips may now be cut into eleven blocks or piles of checks $1^a$, $2^a$, $3^a$, &c., as indicated in Fig. 6. Blocks $1^a$ and $11^a$ will be found to have their checks running in numerical order from "1" to "10." In blocks $2^a$ and $10^a$ there will be a disarrangement of one check in each pile—i. e., in block $2^a$ the check 10 must be placed on the bottom, and in block $10^a$ check 1 must be placed on the top, of their respective piles. So in blocks $3^a$ and $9^a$ there will be a disarrangement of two checks— viz., in blocks $3^a$ checks 9 and 10, which must be placed on the bottom, and in block $9^a$ checks 1 and 2, which must be placed on the top, of the respective piles, and so on with respect to the remaining blocks of checks. But, as is evident, there is a certain method observable in this progressive disarrangement of the checks, and to correct such disarrangement requires no greater mental act than the progressive counting of 1, 1 2, 1 2 3, 1 2 3 4, &c., from the top of the respective piles $2^a$, $3^a$, $4^a$, $5^a$, &c., and no other manipulation than moving each check as so counted to the bottom of its respective pile. In practice this disarrangement bears only on the top and bottom series of the pile printed, which may be of any height or quantity, all of the remaining series being found in regular consecutive order and only requiring separation from each other. In the actual process of manufacture the apparent disarrangement of numbers may be compensated for by the continual piling of additional sections upon the bottom ones, so that after the first removal of disarranged numbers the said piles will always be complete. By throwing the piles upon their edges and by removing complete blocks from the bottom and maintaining a progressive operation the apparent disarrangement will disappear.

In Fig. 4 I have illustrated my invention as applied to a bed and platen press. In this construction the diameter of the cutting-cylinder C would be such as in each revolution to cut off eleven of the numbers printed, the feed-rollers $h$ $h'$ revolving at the same rate of speed as the cylinders C D. I have herein described the assembling of the numbers as being effected by cutting the web into strips containing one more than the given series of numbers. It is evident, however, that the same result may be obtained by cutting the web into strips containing one less than the given series, and in Fig. 7 I have shown a number of strips assembled according to this mode of procedure. In like manner should an alternate arrangement of the numbers be desired this may be effected by cutting the web into strips containing two more than the given series of numbers, as illustrated in Fig. 8, or two less, as illustrated in Fig. 9.

The subsequent manner of procedure in assembling the checks would be on the same lines as described with respect to the arrangement shown in Fig. 5. Where the web is cut into strips containing less than the given series of numbers printed, the cutting-cylinder would of course be proportionately smaller.

The manner in which my invention operates being thus described, it may conduce to a better understanding of the nature thereof to point out one of the uses to which it is applied. This is in the manufacture of what are known as "daily calendars," each of which consists of a block of three hundred and sixty-five leaves detachably connected together, each leaf bearing the name of the month, the day of the week, and the day of the month, suitable space being left thereon for memoranda. In practice such leaves are torn from the block from day to day.

Heretofore the method of manufacturing the calendars has been to impose a convenient number of these pages or leaves in a large form and after printing as many as required to cut them into separate leaves and then to collect or gather them into piles according to their numerical order, after which they are added to other similar piles until the calendar is complete. This mode of procedure is tedious and expensive, besides being subject to the inaccuracies of hand manipulation.

In my method I impose around a cylinder twelve rows of plates, such as indicated by $g$ $g'$, of thirty-one days or leaves each. It is obvious that at each revolution of the printing-cylinder and impression-cylinder a sheet of twelve rows of thirty-one leaves each will be printed, and if the cylinders be fed from an endless web of paper it will continue to print as many complete calendars as the cylinder makes revolutions. As the web passes from the printing-cylinder it is slit longitudinally by the knives or cutters G to form twelve separate slips or webs containing thereon thirty-one leaves for each revolution of the cylinder. Said webs now pass between the cutting mechanism, the cylinder whereof is equal in circumference or time of revolution to thirty-two spaces or leaves of each web. Consequently if the cutting-cylinder is started at the same time as the printing-cylinder and run coincidently therewith it would gain one leaf in each revolution, or, in other words, cut off thirty-two leaves in each revolution, which leaves would comprise the numbers "1" to "31" plus "1." Consequently when the second sheet is fed on top of it said sheet would commence and end with "2," and the following sheet would commence and end with "3," and so on, each sheet commencing with a number one higher than the preceding sheet, until the full number of thirty-one revolutions have been made, when the process is repeated. The strips are then placed in a pile and the whole is cut into blocks of checks by an ordinary paper-cutter, thus giving a gathered or collated product needing very little assembling and assuring accuracy.

The above illustrates one method of employing my invention. It is obvious, however, without further specification that the same is capable of use for many purposes in which an assembled series of numbers is required.

It is also obvious that my invention may be employed with any form of press using an endless web of paper.

I have herein described the web as being cut transversely into strips. Should it be desired, however, to rewind the web for any purpose, instead of the cutter c' I would employ a suitable perforator. The roll or strip could then be unwound at any time and separated at the perforated points, said separated strips being thereby assembled in the manner I have described. By the use of the term "cutting," therefore, I desire to include any means whereby the paper is cut, perforated, folded, or otherwise weakened at the designated points, such being manifestly within the spirit of my invention.

Having thus fully described my invention, what I claim is—

1. In combination with a printing-press adapted to print on an endless web repetitions of a given series of numbers, of mechanism operating to cut said web into strip-sections containing one more than the given series of numbers, substantially as described.

2. In combination with a printing-press adapted to print upon a continuous web repetitions of a given series of numbers, of mechanism operating to cut said web into strip-sections containing a given number of the numbers printed which is differential to the series, substantially as described.

3. In combination with a printing-press adapted to print on an endless web repetitions of a given series of numbers, of mechanism operating to cut and separate said web into strip-sections containing one more than the given series of numbers, substantially as described.

4. In combination with a printing-press adapted to print on an endless web repetitions of a given series of numbers, of mechanism operating to cut and separate said web into strip-sections containing one more than the given series of numbers and a tray or other receptacle, for receiving and assembling such separated strips, substantially as described.

5. In combination with a printing-press having a printing-cylinder adapted to print on an endless web repetitions of a given series of numbers, of cutting mechanism comprising a cylinder having a greater diameter than said printing-cylinder and having on its periphery a knife operating in the revolution of its cylinder to cut said web into strip-sections containing one more than the given series of numbers, substantially as described.

6. In combination with a printing-press having a printing-cylinder adapted to print on an endless web repetitions of a given series of numbers, of cutting mechanism comprising a cylinder having on its periphery a knife operating in the revolution of its cylinder to cut said web into strip-sections containing a given number of the numbers printed which is differential to the series, substantially as described.

7. In combination with a printing-press having a printing-cylinder adapted to print on an endless web a plurality of rows of repetitions of a given series of numbers, of means for separating said web longitudinally into strips containing said numbers, and mechanism operating simultaneously to cut said strips into strip-sections containing one more than the given series of numbers, substantially as described.

8. In combination with a printing-press having a printing-cylinder adapted to print on an endless web a plurality of rows of repetitions of a given series of numbers, of means for separating said web longitudinally into strips containing said numbers, and mechanism operating simultaneously to cut said strips into strip-sections containing a given number of the numbers printed which is differential to the series, substantially as described.

9. The method of assembling in numerical sequence checks, each of which contains one of a given series of numbers, which consists in printing on an endless web repetitions of the series of numbers, separating said web into strip-sections containing one more than the given series of numbers, assembling said strip-sections in the order in which they are detached from the web, cutting said assembled strip-sections into blocks of checks containing the numbers in the series, and finally rearranging the checks in some of the blocks, substantially as described.

10. The method of assembling in numerical sequence checks, each of which contains one of a given series of numbers, which consists in printing on an endless web repetitions of the series of numbers, separating said web into strip-sections containing a given number of the numbers printed which is differential to the series, assembling said strip-sections in the order in which they are detached from the web, cutting said assembled strip-sections into blocks of checks containing the numbers in the series, and finally rearranging the checks in some of the blocks, substantially as described.

In testimony whereof I have hereunto set my hand in presence of two subscribing witnesses.

EDWARD A. HENKLE.

Witnesses:
HARRY R. KEEN,
PHILIP C. SNOW.